United States Patent
Edwards et al.

(10) Patent No.: US 12,115,590 B2
(45) Date of Patent: Oct. 15, 2024

(54) SYSTEM AND METHOD FOR OPENING CONTAINERS

(71) Applicant: Walmart Apollo, LLC, Bentonville, AR (US)

(72) Inventors: James Benjamin Edwards, Centerton, AR (US); Paul E. Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/131,923

(22) Filed: Apr. 7, 2023

(65) Prior Publication Data

US 2023/0241695 A1 Aug. 3, 2023

Related U.S. Application Data

(63) Continuation of application No. 16/854,427, filed on Apr. 21, 2020, now abandoned.

(Continued)

(51) Int. Cl.
*B23D 59/00* (2006.01)
*B23K 26/06* (2014.01)
*B23K 26/38* (2014.01)
*B65B 69/00* (2006.01)
*G06N 3/04* (2023.01)
*G06V 10/20* (2022.01)

(Continued)

(52) U.S. Cl.
CPC ........ *B23D 59/001* (2013.01); *B23K 26/0626* (2013.01); *B23K 26/38* (2013.01); *B65B 69/0033* (2013.01); *G06N 3/04* (2013.01);
*G06V 10/255* (2022.01); *G06V 10/764* (2022.01); *G06V 10/80* (2022.01); *G06V 10/82* (2022.01); *G06V 20/52* (2022.01); *B26D 5/007* (2013.01); *G06K 7/10297* (2013.01)

(58) Field of Classification Search
CPC ...... B23D 59/001; B06V 20/52; B06V 10/82; B06V 10/255; B06V 10/764; B06V 10/80; B23K 26/0626; B23K 26/38; B65B 69/0033; G06N 3/04; B26D 5/007; G06K 7/10297
USPC ........................................................ 53/492
See application file for complete search history.

(56) References Cited

U.S. PATENT DOCUMENTS 4,622,875 A * 11/1986 Emery ................. B07C 5/3412
209/552
5,040,116 A 8/1991 Evans, Jr.
(Continued)

OTHER PUBLICATIONS

Automatic Logistic Solutions; "Press Releases"; http://www.box-opening-system.com/info/press-releases/; Jul. 29, 2015; pp. 1-9.
(Continued)

*Primary Examiner* — Sameh Tawfik
(74) *Attorney, Agent, or Firm* — Fitch, Even, Tabin & Flannery LLP

(57) ABSTRACT

Features are applied to a mathematical model to produce a cutting pattern for opening a container. The cutting pattern specifies which of one or more cutting tools is to be used and the location of where cuts are to be made on the container. The cutting pattern is sent to a container opening machine. The container opening machine is operated and the container cut and opened by the container opening machine according to the cutting pattern.

20 Claims, 8 Drawing Sheets

Related U.S. Application Data

(60) Provisional application No. 62/837,261, filed on Apr. 23, 2019.

(51) Int. Cl.
    *G06V 10/764*     (2022.01)
    *G06V 10/80*     (2022.01)
    *G06V 10/82*     (2022.01)
    *G06V 20/52*     (2022.01)
    *B26D 5/00*     (2006.01)
    *G06K 7/10*     (2006.01)

(56) References Cited

U.S. PATENT DOCUMENTS

| | | | |
|---|---|---|---|
| 5,423,649 | A | 6/1995 | Maeda |
| 7,720,567 | B2 | 5/2010 | Doke |
| 7,769,221 | B1 * | 8/2010 | Shakes .................. G06Q 10/087 705/28 |
| 8,113,427 | B2 | 2/2012 | Ross |
| 8,463,428 | B2 | 6/2013 | Doke |
| 8,507,821 | B2 | 8/2013 | Varghese |
| 8,783,143 | B2 | 7/2014 | Kollman |
| 8,805,565 | B2 | 8/2014 | Izaki |
| 9,412,099 | B1 | 8/2016 | Tyree |
| 9,457,474 | B1 * | 10/2016 | Lisso ....................... B26D 1/45 |
| 9,478,030 | B1 * | 10/2016 | Lecky ....................... G06T 7/62 |
| 9,663,261 | B2 | 5/2017 | Azad |
| 9,686,481 | B1 * | 6/2017 | Graybill ................... H04N 5/32 |
| 9,926,094 | B2 | 3/2018 | Dugat |
| 10,063,814 | B2 | 8/2018 | Wood |
| 10,719,801 | B2 | 7/2020 | Quan |
| 10,955,826 | B2 | 3/2021 | Edwards |
| 11,032,017 | B2 | 6/2021 | Raichelgauz |
| 11,126,950 | B2 * | 9/2021 | Barber .................... G06T 7/001 |
| 11,164,034 | B2 * | 11/2021 | Huang ..................... G06T 7/13 |
| 11,331,758 | B2 | 5/2022 | Hawkins |
| 11,407,589 | B2 | 8/2022 | Wagner |
| 11,550,301 | B2 | 1/2023 | Edwards |
| 11,794,370 | B2 | 10/2023 | Edwards |
| 2001/0003939 | A1 | 6/2001 | Liu |
| 2006/0217838 | A1 | 9/2006 | Sugino |
| 2008/0152082 | A1 * | 6/2008 | Bouchard .............. G01N 23/04 378/57 |
| 2010/0298973 | A1 | 11/2010 | Doke |
| 2012/0175222 | A1 | 7/2012 | Fourney |
| 2015/0058178 | A1 | 2/2015 | Chirnomas |
| 2015/0119216 | A1 | 4/2015 | Benterman |
| 2016/0016684 | A1 | 1/2016 | Dugat |
| 2017/0015456 | A1 | 1/2017 | Stapfer |
| 2018/0038805 | A1 | 2/2018 | Teuvo |
| 2019/0355201 | A1 | 11/2019 | Stapfer |
| 2020/0124484 | A1 | 4/2020 | Fuller |
| 2020/0156257 | A1 | 5/2020 | Sage |
| 2020/0339298 | A1 * | 10/2020 | Edwards .............. G06V 10/764 |
| 2020/0341453 | A1 | 10/2020 | Edwards |
| 2021/0191366 | A1 | 6/2021 | Edwards |
| 2023/0146024 | A1 | 5/2023 | Edwards |
| 2024/0009877 | A1 | 1/2024 | Edwards |

OTHER PUBLICATIONS

Heinz Mayer GMBH; "Sensitive Box Cutter"; https://sensitive-box-cutter.de/en_US/; available on Wayback Machine as of Feb. 22, 2015; 1 page.

MachineDesign; "Automated Box Openers Reduces Warehouse Accidents"; https://www.machinedesign.com/industrial-automation/automated-box-openers-reduces-warehouse-accidents; Oct. 25, 2018; pp. 1-5.

PCT; App. No. PCT/US2020/029098; International Search Report and Written Opinion mailed Jul. 23, 2020.

PCT; App. No. PCT/US2020/029237; International Search Report and Written Opinion mailed Jul. 28, 2020.

TM Robotics; "Automated box opening robots"; https://www.tmrobotics.com/box-opening-solutions/#drawer1_link; available at least as early as Apr. 8, 2019; pp. 1-3.

TM Robotics; "The IBOD System: Intelligent Box Opening Solutions"; https://www.youtube.com/watch?v=MLPq4QvgSE4; published on Apr. 17, 2016; pp. 1-3.

USPTO; U.S. Appl. No. 16/854,492; Notice of Allowance mailed Nov. 19, 2020; (pp. 1-16).

USPTO; U.S. Appl. No. 16/854,427; Non-Final Rejection mailed Aug. 30, 2022; (pp. 1-6).

USPTO; U.S. Appl. No. 16/854,427; Notice of Allowance and Fees Due (PTOL-85) mailed Jan. 12, 2023; (pp. 1-8).

USPTO; U.S. Appl. No. 17/195,939; Notice of Allowance and Fees Due (PTOL-85) mailed Sep. 13, 2022; (pp. 1-14).

USPTO; U.S. Appl. No. 18/151,537; Notice of Allowance and Fees Due (PTOL-85) mailed Jun. 21, 2023; (pp. 1-13).

* cited by examiner

SYSTEM AND METHOD FOR OPENING CONTAINERS

CROSS REFERENCES TO RELATED APPLICATIONS

This application is a continuation of U.S. patent application Ser. No. 16/854,427, filed Apr. 21, 2020, which claims the benefit of U.S. Provisional Application No. 62/837,261, filed Apr. 23, 2019, both of which are incorporated herein by reference in their entireties.

TECHNICAL FIELD

These teachings relate to approaches for opening containers such as boxes without damaging the contents of the container.

BACKGROUND

Boxes, crates, cases, and other types of containers are used to ship various types of products. The containers may arrive at a warehouse, distribution center, or retail store and need to be opened. In one example, the containers are opened manually. However, in other examples and when large number of containers are shipped and received, a cutting or opening machine is used to remove the top of the container (or otherwise open the container). Once opened, the contents of the container can be removed, for example, by a robot or by a human.

The containers are typically opaque and, consequently, the contents are not visible either to a human or machine opening the container. Since the cutting or opening machine is unaware of the contents or how the contents are arranged, the cutting or opening process may result in damage to the contents of the container. For example, a cutting machine that removes the top of a shipping case may also cut off a portion of an item that is being shipped in the shipping case.

BRIEF DESCRIPTION OF THE DRAWINGS

The above needs are at least partially met through the provision of approaches that opens containers, wherein.

DETAILED DESCRIPTION

Figure 1:
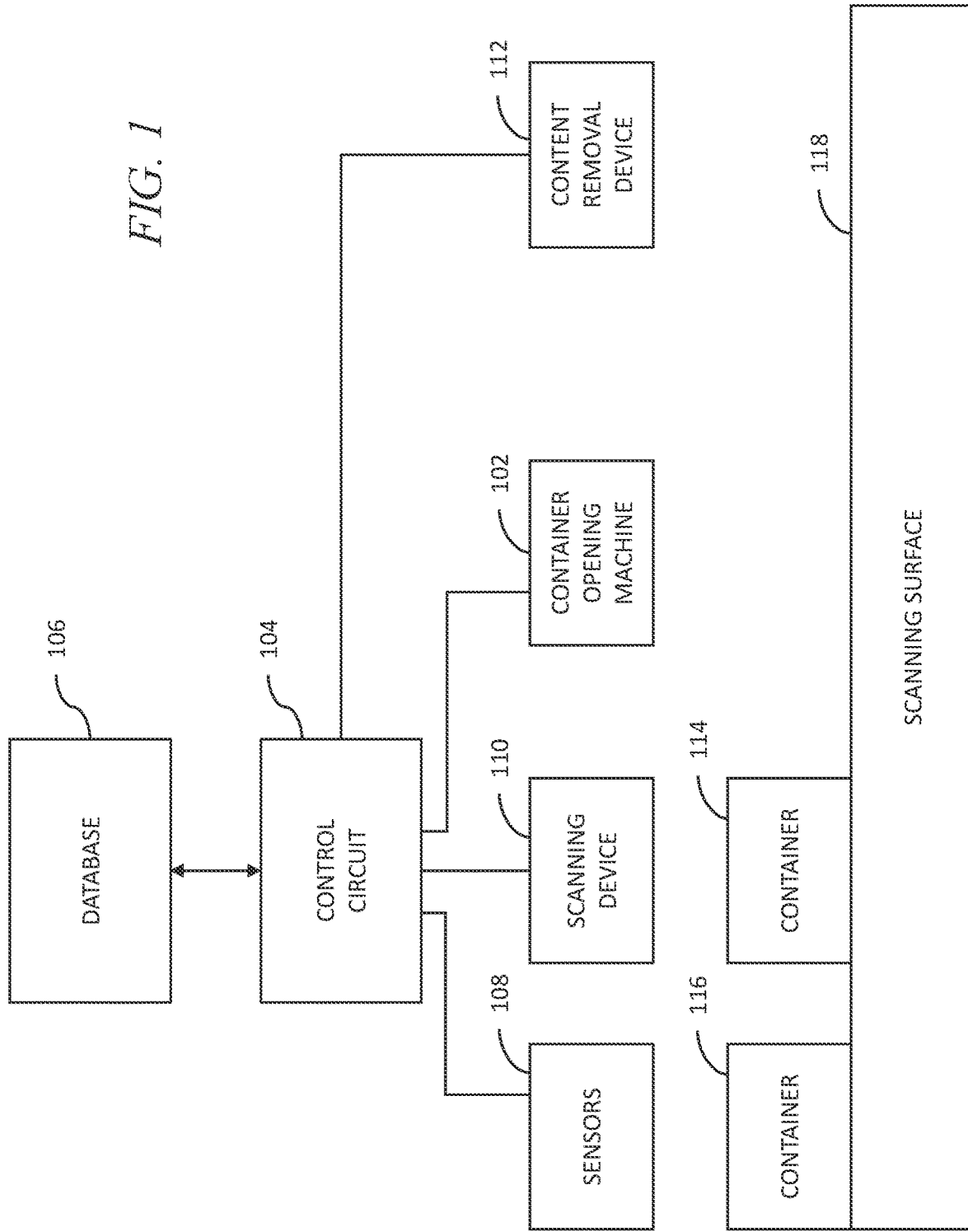
FIG. 1 comprises a diagram of a system as configured in accordance with various embodiments of these teachings.

Generally speaking, the present approaches use millimeter wave (or other wavelength) technology to scan an opaque container to see the contents of the container and determine how and where to make cuts to remove the top (or other portions) of the container allowing robotic pickers (or other devices or humans) to easily access the container and/or remove these contents. For example, based on a scan, the system determines what type of cutting tool to use, the amount of force the tool should use, the locations of cuts and/or the depths of cuts. In aspects, the approaches described herein are directed to scanning the container before the contents of the container are removed (and before the container is cut and/or opened), and then selecting appropriate cut settings (e.g., appropriate cutter (blade, laser, etc.) and appropriate location, penetration depth, force, shape, etc. of the cut) based upon an analysis of scanned images of the internal contents of the container and potentially other information.

In some aspects, the approaches provided herein use millimeter wave technology to identify the shape and orientation of the products in an opaque container before opened. Once the internal geometry of the contents of the container is determined, various actions may be taken such as determining how to open the container and remove the contents.

In one example, the case-opening cut parameters may be determined such that the cut does not protrude far enough into the container to damage products in the container, but does protrude far enough into the container to cut fully through the container wall. In another example, the cut location(s) may be placed in location where the product surface is farthest from the inner container wall, such that the likelihood of product damage is minimized.

In aspects, at least some part of the approaches provided herein occur during the case opening part of a decantation process (where the container is opened and its contents removed). The automated case cutting process includes stored parameters for the cut action that took place. Such parameters include: the type of cutter used (e.g., knife blade, reciprocal saw blade, circular saw blade, laser), a blade penetration depth, a blade traversal speed, a saw reciprocation or circulation rate, a saw reciprocation distance (how far back and forth when sawing), laser intensity, and laser distance from surface. Other examples are possible.

In many of these embodiments, a system for opening a container includes a scanning surface; a plurality of containers that arrive and are sequentially placed on the scanning surface; a scanning device; a sensor; a database that stores a mathematical model; and a container opening machine that includes at least one cutting tool. The cutting tool is one or more of a saw blade or a laser, and the cutting tool is applied to each of the plurality of containers arriving on the scanning surface to open the container. The system also includes a control circuit that is coupled to the database, the scanning device, the sensor, and the container opening machine.

The control circuit is configured to: receive sensor data from the sensor, the sensor data identifying the contents of the container; receive scanned images from the scanning device, the scanned images being of the contents of the interior of the container; analyze the sensor data and the scanned images to obtain features of the contents of the container; apply the features to the mathematical model to produce a cutting pattern, the cutting pattern specifying which of the one or more cutting tools to be used and the location of where cuts are to be made; and send the cutting pattern to the container opening machine. The container opening machine is operated and the container cut and opened by the container opening machine according to the cutting pattern.

In other aspects the cutting pattern further includes the depth of the cuts into the container. In still other examples, the cutting pattern further includes the speed of the cutting tool.

In examples, the features of the contents include one or more of the dimensions of the contents, the spacing of the contents, the shape of the contents, the size of the contents, the number of contents in the container, the monetary value of the contents, and the orientation of the contents. Other examples are possible.

In other aspects, the container includes a label or tag that is scanned and the sensor data is sensed from the label or tag. In still other aspects, the containers include the same type of items. In yet other examples, the containers contain different types of items.

In another example, the cutting pattern species that the cutting tool selected is a laser and that the intensity of the laser is adjusted to a predetermined value.

In aspects, the mathematical model is a convolutional neural network (CNN). Other examples are possible.

In other examples, the scanning surface is a conveyor belt. Other examples are possible.

In others of these embodiments, a scanning surface, a plurality of containers that arrive and are sequentially placed on the scanning surface, a scanning device, a sensor and a database that stores a mathematical model are provided. A container opening machine that includes at least one cutting tool is also provided. The cutting tool is one or more of a saw blade or a laser. The cutting tool is applied to each of the plurality of containers arriving on the scanning surface to open the container.

At a control circuit, sensor data is received from the sensor, the sensor data identifying the contents of the container. At the control circuit, scanned images are received from the scanning device. The scanned images are of the contents of the interior of the container.

At the control circuit, the sensor data and the scanned images are analyzed to obtain features of the contents of the container. At the control circuit, the features are applied to the mathematical model to produce a cutting pattern. The cutting pattern specifies which of the one or more cutting tools is to be used and the location of where cuts are to be made. The control circuit sends the cutting pattern to the container opening machine. The container opening machine is operated and the container cut and opened by the container opening machine according to the cutting pattern.

Referring now to FIG. 1, a system 100 is configured to open one or more containers. The system 100 includes a container opening machine 102, a control circuit 104, a database 106, sensors 108, a scanning device 110, a content removal device 112, a first container 114, a second container 116, and a scanning surface 118. Some or all of these elements may be disposed at a warehouse, retail store, or discount center. Other examples of locations are possible. In one particular example, the elements are all disposed at a warehouse so that large amounts of data do not have to be moved to or between networks (e.g., the cloud).

The container opening machine 102 is any type of device or combination of devices that are effective to open (e.g., cut, slash, pierce, and/or remove portions of) the containers 114 and 116. The container opening machine 102 includes one or more cutting tools (e.g., lasers, circular saws, reciprocating saws, other saws, drills, blades, knives, or other types of tools). The cutting tools may be disposed on a robotic arm that moves about the container. The operation of the container opening machine 102 may be controlled by parameters stored at the container opening machine 102. For example, the container opening machine 102 may itself have a control circuit that is operated according to stored parameters or values. One stored value (parameter) may represent the cutting tool (or tools used), another value (parameter) may relate to the depth of a cut, other parameters may specify the shape of a cut, and still other parameters may describe other details of the cut or how to obtain the cut.

These parameters may be stored at a memory at the container opening machine 102 in any type of data storage format. It will be appreciated that the container opening machine 102 may have its parameters reset upon the opening of each different container.

In other examples, a model (e.g., a convolutional neural network (CNN) model) may represent containers and the cutting patterns. The CNN model may be stored in the database 106. In aspects, the CNN model is first trained with training data from various containers. The training alters the layers, weights, and other parameters of the model. After the training process is completed, a particular container is scanned to obtain images of its contents, and a label (or other identifier) on the particular container is scanned (e.g., to obtain information that may not be determined by image analysis such as the monetary value of items in the container). Information obtained from the images and/or the label is applied to the CNN model to obtain a pattern that can be used by the container opening machine 102 to open the particular container. One or more CNN models can be used. In other examples, the model may be a series of equations, a flowchart (implemented as computer code), or other elements.

In aspects, when the containers 114 and 116 are opened, a cutting pattern is used to perform or make the opening. By pattern, it is meant one or more of: the location of cuts in or at the container, the dimensions (length, width, depth) of the cuts, the amount of force applied to the cuts (e.g., when the tool is a saw), the intensity of the laser beam (when the cutting tool is a laser), and the amount of time the tool is used. In other aspects, the pattern also includes the identity of the tool (or tools used), when these tools are used, and how these tools are used (e.g., one tool may be used to open one portion of a container and another tool used to open another portion of a container). Other examples are possible.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 104 may be configured (for example, by using corresponding programming stored in a memory as will be well understood by those skilled in the art) to carry out one or more of the steps, actions, and/or functions described herein.

The database 106 is any type of electronic memory storage device or computer memory. The sensors 108 are any type of sensors that read information from the containers 114 and 116. For example, the sensors 108 may be RFID (or label) sensors that read RFID tags (or labels such as barcodes) on the containers 114 and 116. The tags or labels associated with the containers 114 and 116 have associated information. For example, a label may be encoded with information including the type of items in a container, the value of items in a container, the number of items in a container, the dimensions of items in a container, or any other characteristic of items in a container. The information may also uniquely identify the container (e.g., the label may be a barcode with a container ID). This information may be of the type difficult or impossible to obtain via image analysis (e.g., information such as a precise monetary value of the items in a container).

The scanning device 110 is any type of scanning device that obtains images of the contents of the container 114 and container 116. In aspects, the scanning device 110 obtains images using millimeter wave technology (obtaining images to identify the shape and orientation of the products or items in the container 114 and 116). Other examples (e.g., that obtain images in other radiation frequencies) such as x-rays may also be used. In examples, the scanning device 110 transmits millimeter waves from antennas. The wave energy reflected back from the container and the contents of the containers 114 and 116 is used to construct images, which can be analyzed by the control circuit 104.

In other examples, different types of scanning technology and devices can be used for different purposes (e.g., obtain images or information about different aspects and/or contents of a container). In other words, multiple scanning devices using different types of scanning technology can be deployed. In one example, a camera (a first scanning device) obtains images in the visible light spectrum of the outside of the container, while a second scanning device (using a different scanning technology) such as millimeter wave technology is used to obtain images of the contents of the container. In this example, a first analysis can be undertaken of the visible light camera images, while a second analysis can be performed on images (or other obtained information) obtained from the scans made by the millimeter technology. In this way, information about the container itself (e.g., damage) and information about the contents of the container is obtained. It will be appreciated that different types of technology including millimeter, x-ray, acoustic, ultrasound, visible light and combinations of these can be used.

In still other examples, more than two types of technology can be used to obtain information concerning the container and/or contents of the container. For example a first scanning device is used to obtain visible light images of the exterior of the container. A second scanning device utilizes millimeter scanning technology to obtain images concerning the contents of the container. A third scanning device utilizes a different type of scanning technology such as x-rays either to obtain additional information about the contents and/or confirm information obtained by the first and/or scanning devices.

The content removal device 112 is any type of device or combination of devices that can remove the contents of the containers 114 and 116. In examples, the content removal device 112 may be a robot with arms, levers, and grips that are operated to remove the contents of the containers 114 and 116 once the containers are opened.

The first container 114 and the second container 116 are any type of structure that holds items, for example, as the items are shipped from a first location to a second location. The containers 114 and 116 may have walls that are opaque in that humans or machines cannot see into the containers and cannot ascertain the contents of the containers. In other words, the contents of the containers are ordinarily hidden without using images obtained by the canning device 110. In examples, the containers may be cardboard container, constructed of metal, or constructed of plastic. Other examples are possible. Various types of items may be shipped in the containers. For example, bottles, cans, other boxes, and various other items may be placed in the containers 114 and 116.

The scanning surface 118 may be any type of surface such as a flat surface where the containers 114 and 116 can be disposed as the containers are opened. In other aspects, the scanning surface 118 is a conveyor belt that sequentially moves the containers 114 and 116 over time. For example, the conveyor belt first moves the container 114 to a first position, and the scanning device 110 obtains an image of the contents. The sensors 108 also scan a label on the container 114 to obtain product information. Based upon the images and the information from the scanning device 110, a pattern is selected by the control circuit 104. The container opening machine 102 then opens the container 114 according to the pattern from the same location or after the conveyor moves the container to a new location. Then, the container 114 is moved to the content removal machine 112 where the contents of the container 114 are removed from the container 114. Alternatively, the container 114 may stay at the same location. The same procedure is followed for the container 116 as the container 116 follows the container 114 sequentially in time on the conveyor belt.

In examples, the various factors applied to the model can be weighted in importance. For example, the cost of items may be viewed as more important than the tool to be used to do the cutting. The weights can then be used to influence the selection of the pattern.

In one example of the operation of the system of FIG. 1, the control circuit 104 receives sensor data from the sensors 108. The sensor data identifies the contents of the containers 114 and 116 and may also include identifiers that uniquely identify the containers 114 and 116. At the control circuit 104, scanned images are received from the scanning device 110. The scanned images are of the contents of the interior of the containers 114 and 116 and may also identify the container.

At the control circuit 104, the sensor data and the scanned images are analyzed to obtain features of the contents of the containers 114 and 116. The analysis may include any technique known to those skilled in the art to obtain the features (e.g., the shape of an item in a container, the material a container is constructed, the amount of empty space in the container). For instance, obtained images can be compared to images of known shapes to determine the specific shapes of items in a particular container.

At the control circuit 104, the features are applied to the mathematical model to produce a cutting pattern. The cutting pattern specifies which of the one or more cutting tools is to be used and the location of where cuts are to be made. The control circuit 104 sends the cutting pattern to the container opening machine 102. The container opening machine 102 is operated and the container cut and opened by the container opening machine 102 according to the cutting pattern.

Figure 2:
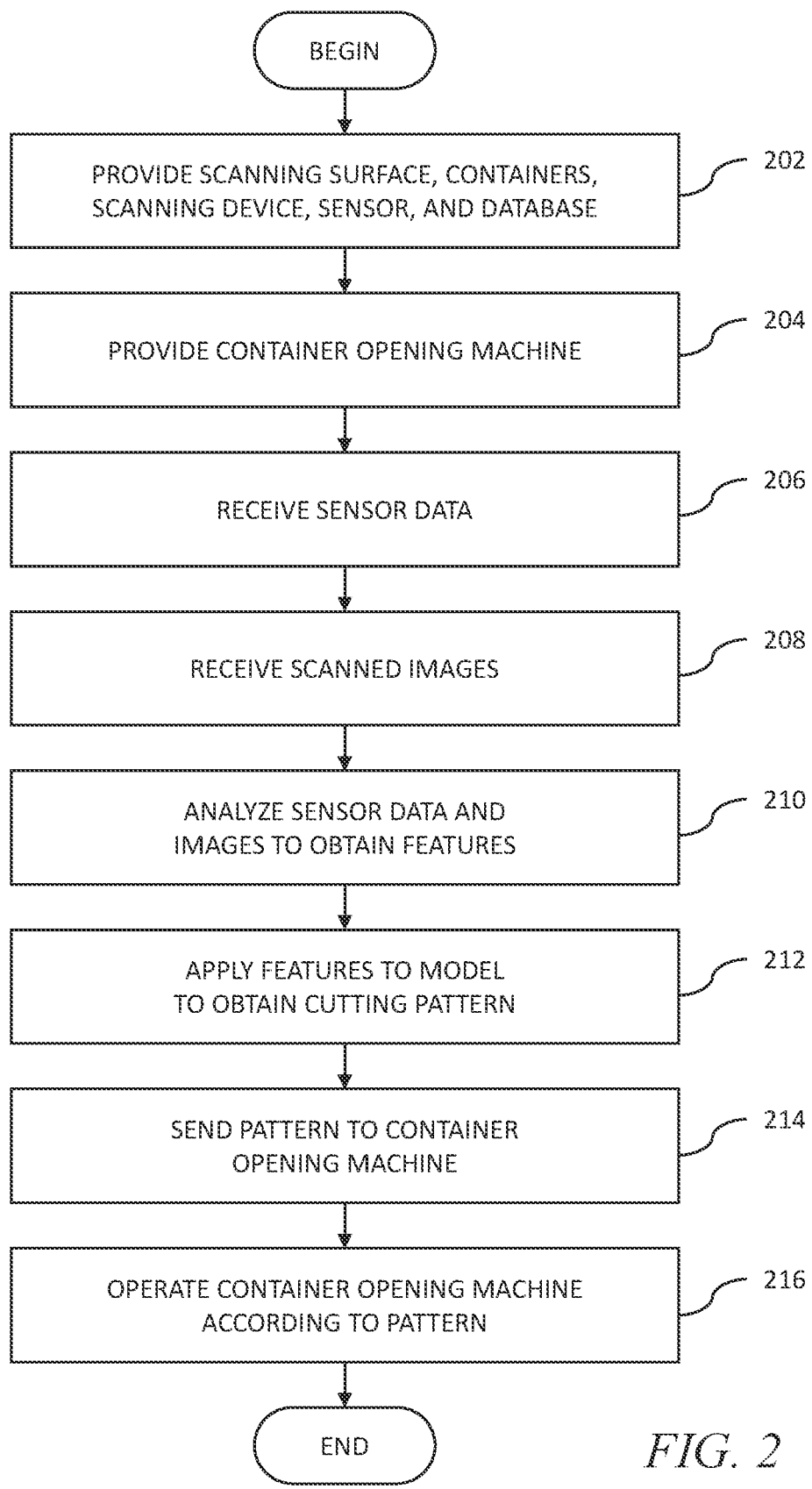
FIG. 2 comprises a flowchart as configured in accordance with various embodiments of these teachings.
Figure 3A:
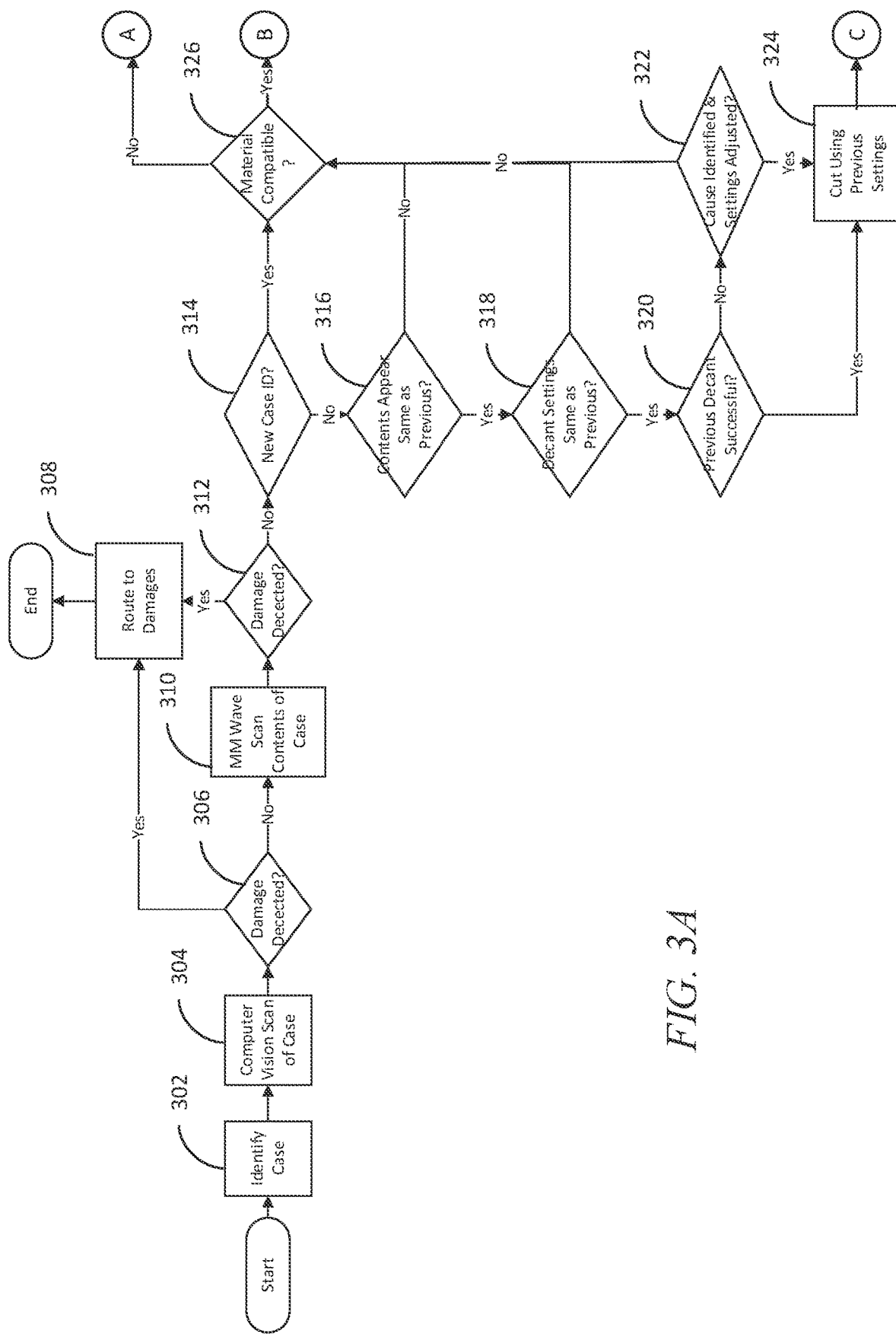
FIGS. 3A, 3B, 3C, and 3D comprise diagrams of an approach as configured in accordance with various embodiments of these teachings.
Figure 3B:
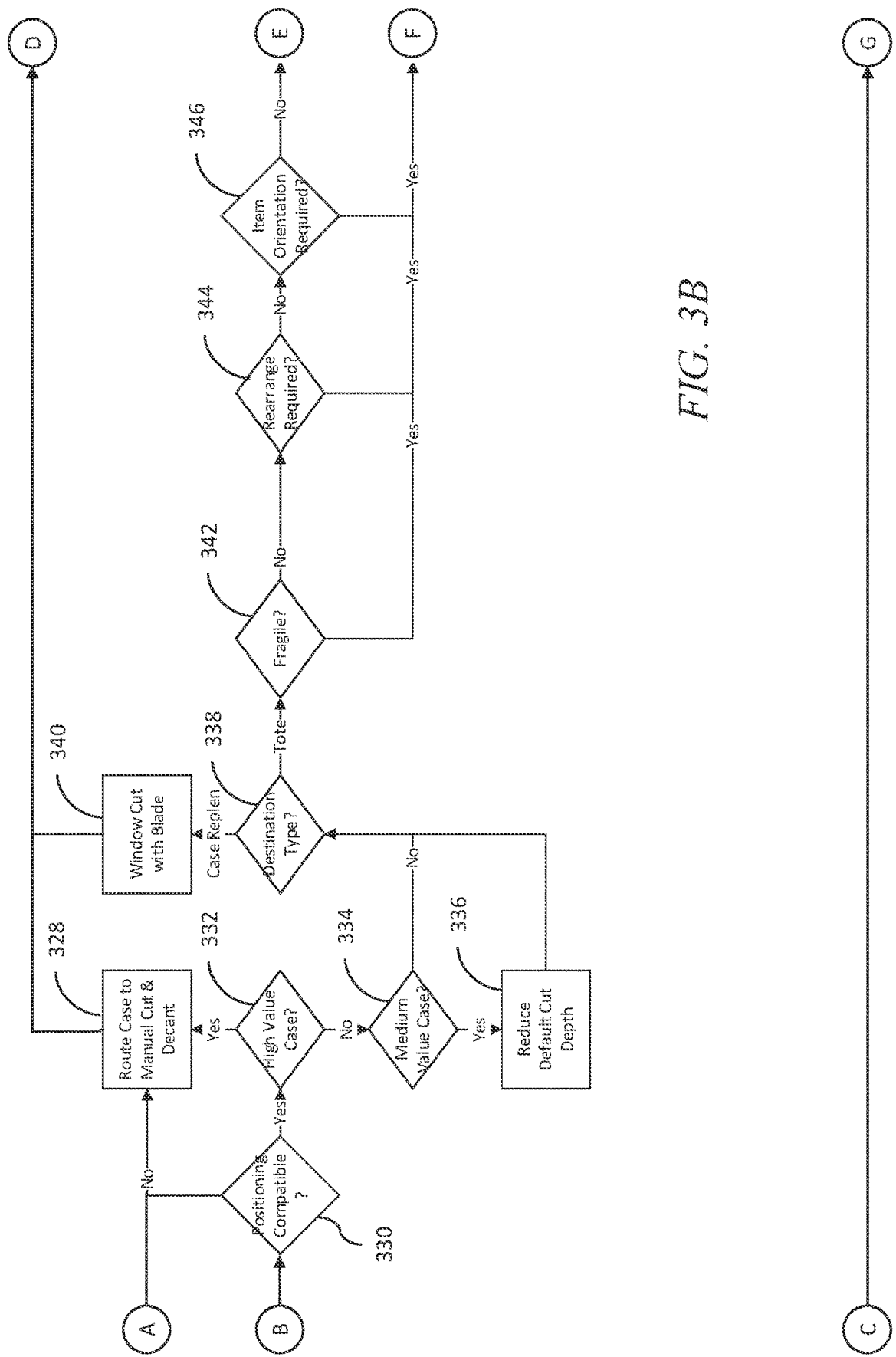
Figure 3C:
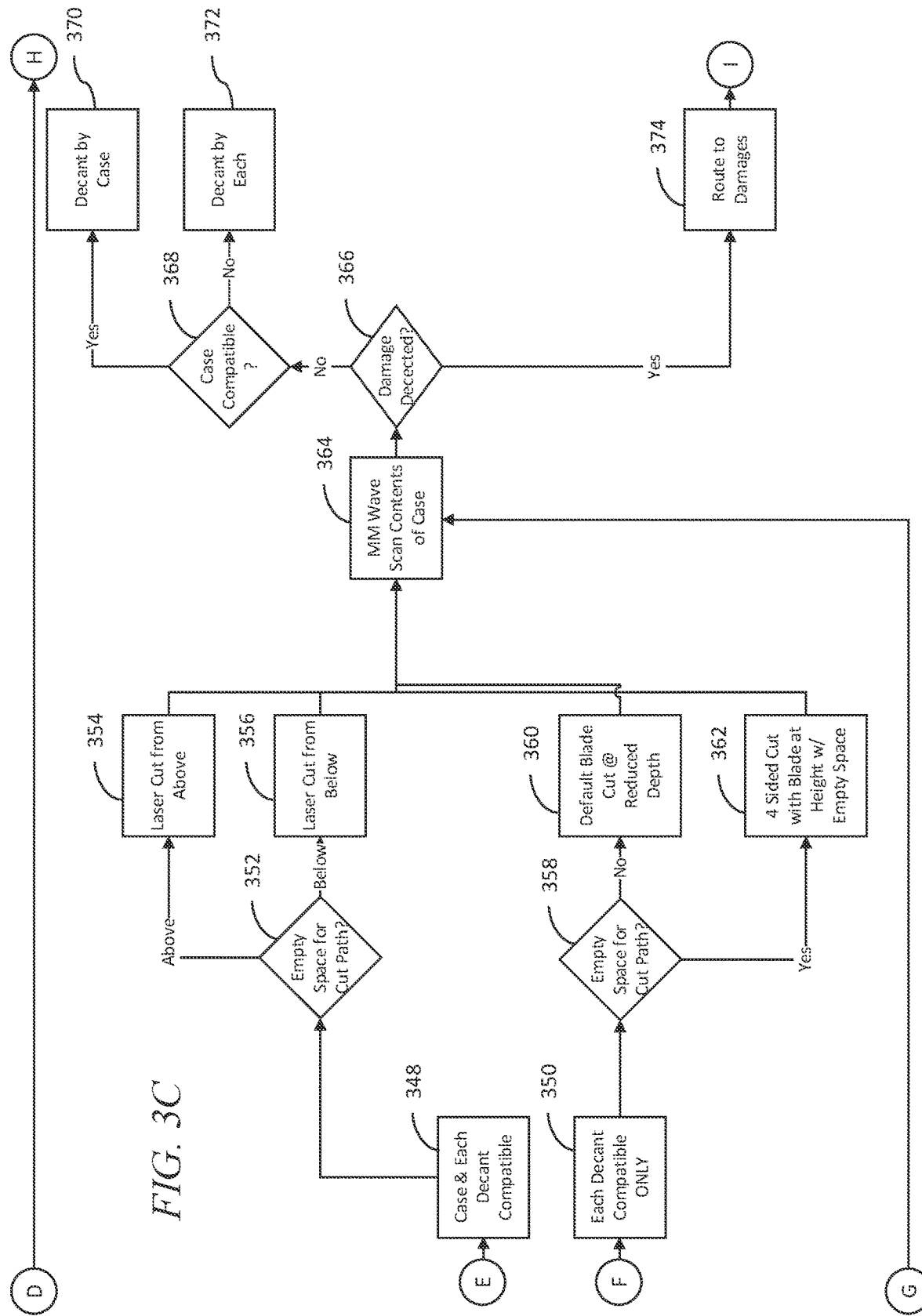
Figure 3D:
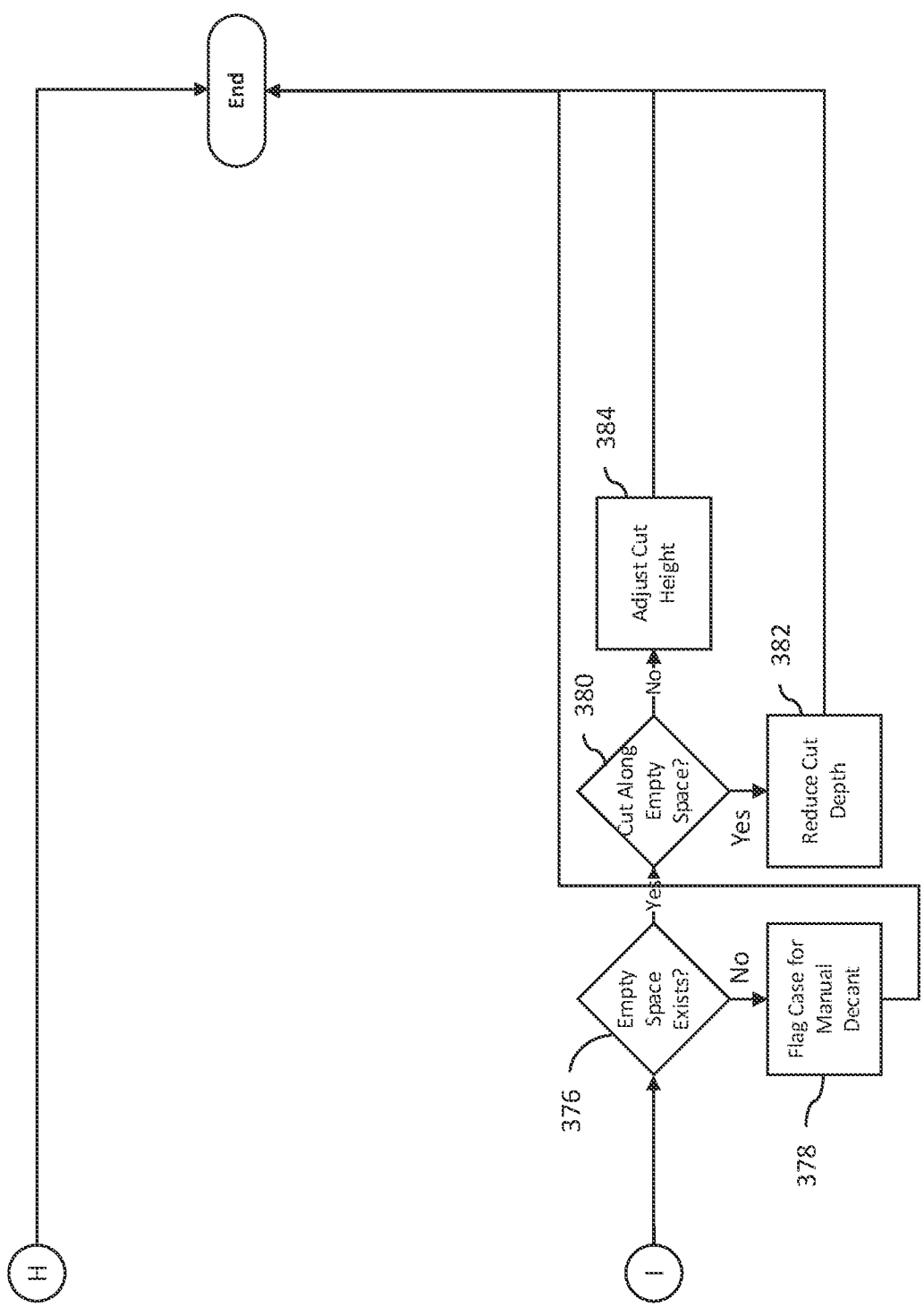

Referring now to FIG. 2, one example of an approach for opening and removing the contents of containers is described. At step 202, a scanning surface, a plurality of containers (that arrive and are sequentially placed on the scanning surface), a scanning device, a sensor and a database that stores a mathematical model are provided. At step 204, a container opening machine that includes at least one cutting tool is also provided. The cutting tool is one or more of a saw blade or a laser. The cutting tool is applied to each of the plurality of containers arriving on the scanning surface to open the container.

At step 206 and at a control circuit, sensor data is received from the sensor. The sensor data identifies the contents of the container and/or uniquely identifies the container. At step 208 and at the control circuit, scanned images are received from the scanning device. The scanned images are of the contents of the interior of the container. In one example, the scanned images are obtained using millimeter sensing technology.

At step 210 and at the control circuit, the sensor data and the scanned images are analyzed to obtain features of the contents of the container. Image processing techniques known to those skilled in the art can be used to discern from the images features of the container and/or items in the container. These features may include one or more of: the dimensions of the contents, the spacing of the contents, the shape of the contents, the size of the contents, the number of contents in the container, the monetary value of the contents, the orientation of the contents, the material from which the container or contents is constructed, or other characteristics of the contents and/or the container.

At step 212 and at the control circuit, the features are applied to the mathematical model to produce a cutting pattern. In one example, the model is a CNN model. In other examples, the model is an algorithm implemented as computer code that is executed by a control circuit. Other examples of models are possible. In aspects, the cutting pattern specifies which of the one or more cutting tools is to be used and the location of where cuts are to be made. Other types of information and parameters can also be supplied by the pattern.

At step 214, the control circuit sends or transmits the cutting pattern to the container opening machine. The sending may be accomplished across any wired and/or wireless communication link.

At step 216, the container opening machine is operated and the container is cut and opened by the container opening machine according to the cutting pattern.

Referring now to FIG. 3, one example of a decantation process (how the contents are opened and removed from a container) is described. It will be appreciated that the cut method is the method used for cutting or opening as case such as annual, a robotic arm with a blade, or a laser to mention a few examples. It will be understood that the cut type is the type of cut applied to the case such as a window-type cut (e.g., such as a window opening on any structure for case replenishment, or a 4-sided cut). "Decant method" refers to how the contents of the case are removed from the case such as dumping. Further, it will be appreciated that the terms "container" and "case" are used interchangeably herein. It will additionally be understood that the various ones of these steps may be performed by a control circuit that is analyzing images or processing other inputs. Furthermore, the contents of cases may be disposed in product totes, which are containers that can be used to store, transport, and/or display products to customers in retail stores.

At step 302, the case or container is identified. In one example, a label on the container is read and in another example, an RFID tag is read. The information read may include information that identifies the container (e.g., has a container number or other identifier that uniquely identifies the container and other information such as the contents of the container or the monetary value of the contents).

At step 304, a computer vison scan of the case or container is made. The scan obtains images (e.g., in visible light) that shows damage to the case.

At step 306 and based, for example on the scan of step 304, it is determined if the case is damaged. If the answer is affirmative, execution continues at step 308 where the case is physically routed and moved to a damage processing area, where, for example, a determination can be made as to whether to dispose of the case. Execution then ends.

If the answer at step 306 is negative, at step 310 a scanner obtains images using millimeter sensing technology to scan through the opaque walls of the container to identify, for example, the shape, disposition, and other information regarding the contents of the case or container.

At step 312 and based, for example on the scan of step 310, it is determined if the contents of the case are damaged. If the answer is affirmative, execution continues at step 308 as described above. If the answer is negative, then execution continues with step 314.

At step 314, it is determined if the case associated with a new case identifier (a case not processed before). If the answer is affirmative, execution continues at step 326. If the answer is negative, execution continues at step 316.

At step 316, it is determined whether the contents appear to be the same as they were at a previous time. If the answer is negative, execution continues with step 326. If the answer is affirmative, execution continues with step 318.

At step 318, it is determined whether the decant settings (e.g., all inputs for decanting a case, for instance the type of tote the contents were placed) appear to be the same as they were at a previous time. If the answer is negative, execution continues with step 326. If the answer is affirmative, execution continues with step 320.

At step 320, it is determined whether the previous decant (removal of the contents) at a previous time was successful. If the answer is negative, execution continues with step 322. If the answer is affirmative, execution continues with step 324.

At step 322, it is determined if the cause for the unsuccessful decant was identified and the settings adjusted. If the answer is negative, then execution continues at step 326. If the answer is affirmative, then execution continues at step 324.

At step 324, the cutting of the container is made with the previous settings. Execution continues at step 364.

At step 326, it is determined if the material of the case is compatible with the tools used to remove or cut the case. If the answer is negative, execution continues at step 328 and if the answer is affirmative, execution continues with step 330.

At step 328, the case is routed to be manually cut and decanted. Execution then ends.

At step 330, it is determined if the position of the contents is compatible with the cutting tools, cutting pattern, or other cutting parameter to be used. If the answer is negative, then, step 328 is executed as described above. If the answer is affirmative, step 332 is executed.

At step 332, it is determined if the case or its contents is of high value (e.g., each of the contents or all of the contents together have a monetary value above a threshold). If the answer is affirmative, step 328 is executed as described above. If the answer is negative, execution continues with step 334.

At step 334, it is determined if the case or contents have a medium value (e.g., each of the contents or all of the contents together have a monetary value between a first and a second threshold). If the answer is affirmative, step 336 is executed. If the answer is negative, execution continues with step 338.

At step 336, the cutting depth is reduced. At step 338, the destination type is determined. The destination type specifies whether the case is being replenished as a full case or whether the contents are being removed to be placed in a tote. If the destination is a tote, step 342 is executed. If the destination is not a tote, but to simply use the case as a full case to display or present the products, then step 340 is executed. At step 340, a window cut (to show the products) is made to the container with a blade. Execution then ends.

At step 342, a determination is made if the case or items in the case are fragile. If the answer is affirmative, then execution continues with step 350. If the answer is negative, execution continues with step 344. This information can come from analyzing container images, human input, or from label information from the container.

At step 344, a determination is made as to whether the items in the case need to be rearranged. If the answer is affirmative, execution continues with step 350. If the answer is negative, execution continues with step 346.

At step 346, a determination is made as to whether the items in the case need to be reoriented. If the answer is affirmative, execution continues with step 350. If the answer is negative, execution continues with step 348.

At step 348, the contents of the case can be dumped into a tote (by a human or a robot) without a special procedure. Next, at step 352, a determination is made as to whether there is empty space in the container for the cut path of a cutting tool. If the answer is empty space exists at the top of the container (above), step 354 is executed where a cut from above is selected; if the answer is there is empty space at the bottom of the container, at step 356 a cut from below is used is used. Execution continues at step 364.

At step 350, the contents of the case are dumped (by a human or a robot) into a tote individually in a specified manner. At step 358, a determination is made as to whether there is empty space in the container for the cut path of the cutting tool. If the answer is negative, step 360 is executed where a default blade cut reduced depth is used; if the answer is affirmative, at step 362 a four-sided cut with a blade at a height within the empty space is used. Execution continues at step 364.

At step 364, a millimeter wave scan is made of the case and the contents is made. At step 366, it is determined if damage to the case or contents exists. If the answer is negative, execution continues with step 368. If the answer is affirmative, execution continues with step 374.

At step 368, it is determined if the case is compatible with dumping the contents (by a human or a robot) into a tote. If the answer is affirmative, at step 370, the entire contents of the case are dumped into the tote. If the answer is negative, at step 372, the contents of the case are put (decanted) into the tote individually, one-by-one.

At step 374, the case is routed to a damage processing area. Next, at step 376, a determination is made if empty space exists in the case. If the answer is negative, at step 378, the case is flagged for manually decanting and execution ends.

If the answer is affirmative at step 376, at step 380 a determination is made as to whether to cut along the empty space. If the answer is affirmative, cut depth is reduced and execution ends. If the answer is negative, the height of the cut is adjusted and execution ends.

Figure 4:
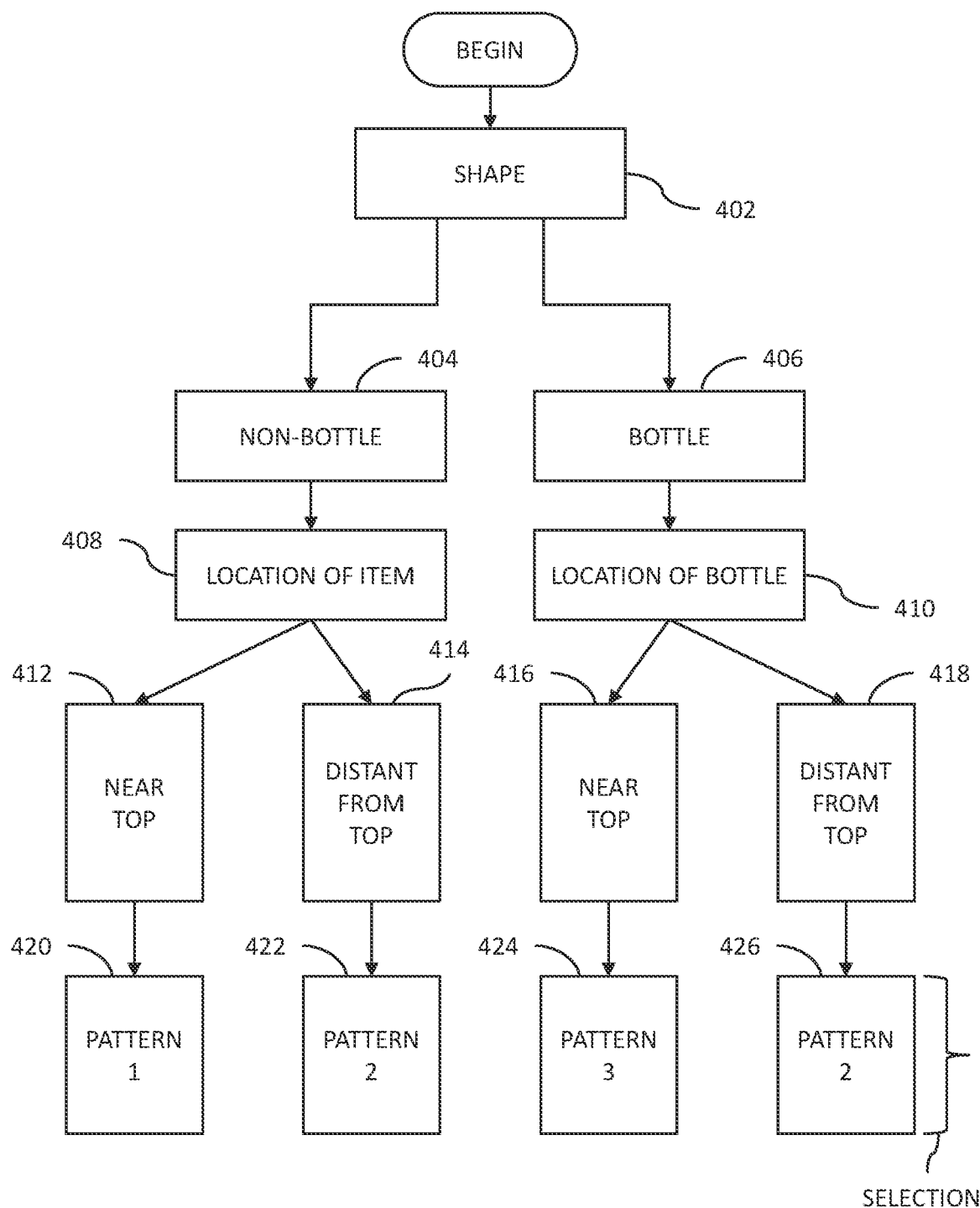
FIG. 4 comprises a diagram of a system as configured in accordance with various embodiments of these teachings.

Referring now to FIG. 4, one example of determining a cutting pattern is described. The example of FIG. 4 is, in aspects, a model implemented as an algorithm (or a lookup table) but it will be appreciated that it could also be implemented as a CNN model.

At step 402, image analysis determines that a shape of an item is a non-bottle shape 404 or a bottle shape 406. Image analysis also indicates locations 408 and 410 of the items in a container as being near the top of the container (labeled as 412 and 416) or distant from the top of the container (by a predetermined distance and labeled as 414 and 418). Based upon the item shape and location, specific cutting patterns (labeled as 420, 422, 424, and 426) are selected.

In one example, a non-bottle shape near the top selects pattern 420 (pattern 1). In another example, a non-bottle shape distant from the top selects pattern 422 (pattern 2). In yet another example, bottle shape near the top selects pattern 424 (pattern 3). In still another example, a bottle shape distant from the top selects pattern 426 (pattern 2). The patterns 1, 2, and 3 are unique combination of parameters that set the operation of the container opening machine (e.g., the container opening machine 102) as described elsewhere herein.

Figure 5:
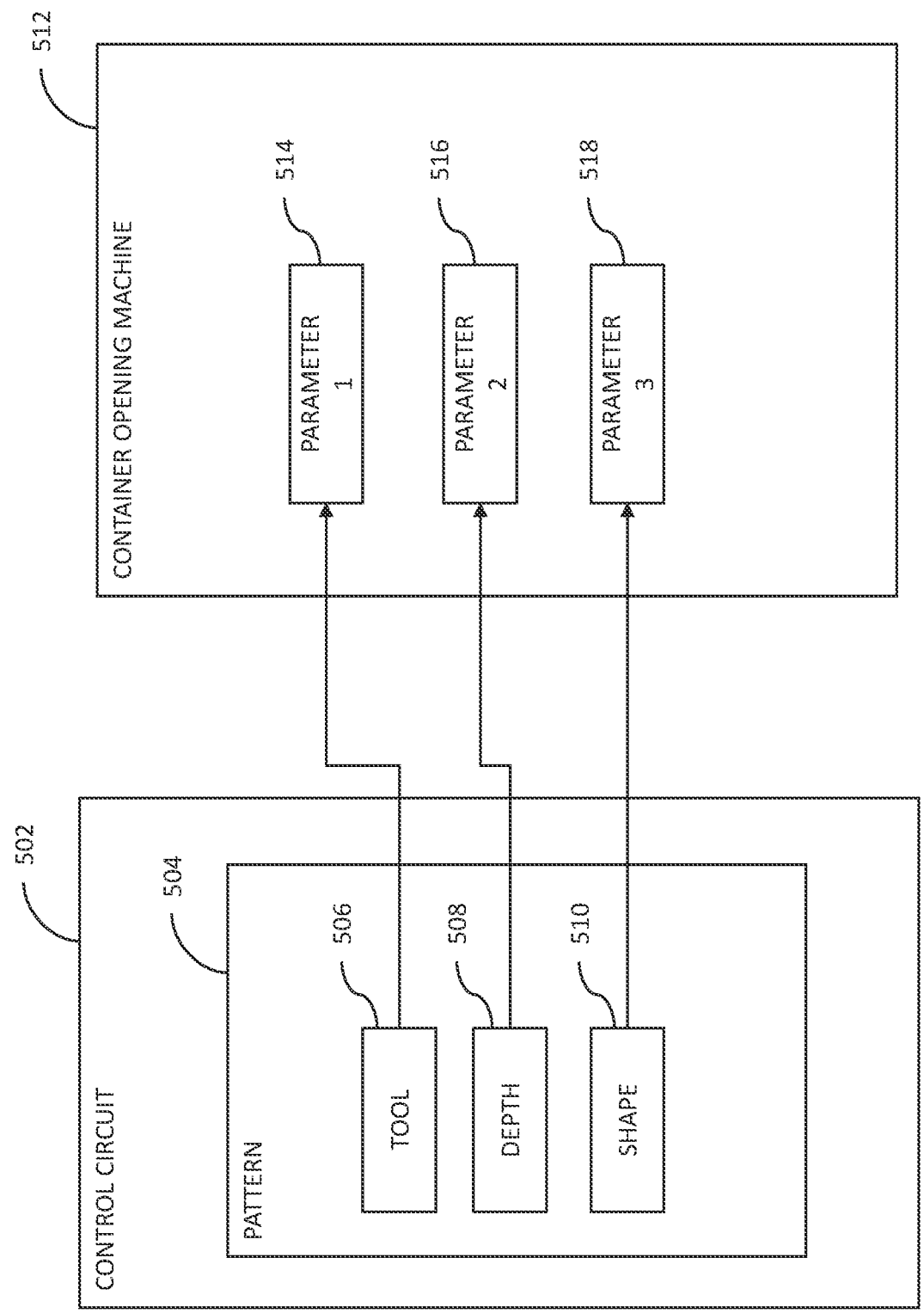
FIG. 5 comprises a diagram of a system as configured in accordance with various embodiments of these teachings.

Referring now to FIG. 5, one example of mapping a pattern to parameters on a container opening machine is described. A control circuit 502 generates a cutting pattern 504. The cutting pattern 504 has first feature 506 (specifying the cutting tool or tools used, e.g., a saw), a second feature 508 (specifying a cutting depth); and a third feature 510 (specifying a cutting shape).

The features 506, 508, and 510 are mapped to container opening machine 512. More specifically, the first feature 506 maps to a first parameter 514; the second feature 508 maps to a second parameter 516; and the third feature 510 maps to a third parameter 518. In examples, the parameters 514, 516, and 518 are implemented as memory locations that have values that are set (and are changed as the patterns change). In operation, the container opening machine 512 utilizes these values to use, direct, and control a cutting tool that opens a container.

In some embodiments, one or more of the exemplary embodiments include one or more localized IoT devices and controllers (e.g., included with or associated with the various scanners, sensors, cameras, or robots described herein). In another aspect, the sensors, cameras, or robots may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernels of data in order to filter out data that may reflect generic background data. In an exemplary embodiment, KRG incrementally sequences all future undefined cached kernels having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for opening a container, the system comprising:
    a database that stores a mathematical model;
    a container opening machine including at least one cutting tool, the at least one cutting tool being one or more of a saw blade or a laser, wherein the at least one cutting tool is applied to each of a plurality of containers arriving on a scanning surface to open the container;
    a control circuit coupled to the database, one or more sensing devices, and the container opening machine, wherein the control circuit is configured to:
    receive sensor data and scanned images from the one or more sensing devices, the sensor data identifying the contents of the container and the scanned images being of the contents of the interior of the container;
    analyze the sensor data and the scanned images, wherein features of the contents of the container is obtained;
    apply the features to the mathematical model wherein a cutting pattern is produced, the cutting pattern specifying which of the one or more cutting tools to be used and the location of where cuts are to be made;
    send the cutting pattern to the container opening machine;
    wherein the container opening machine is operated and the container cut and opened by the container opening machine according to the cutting pattern.

2. The system of claim 1, wherein the cutting pattern further includes the depth of the cuts into the container.

3. The system of claim 1, wherein the cutting pattern further includes the speed of the cutting tool.

4. The system of claim 1, wherein the features of the contents include one or more of the dimensions of the contents, the spacing of the contents, the shape of the contents, the size of the contents, the number of contents in the container, the monetary value of the contents, and the orientation of the contents.

5. The system of claim 1, wherein the container includes a label or tag that is scanned by the one or more sensing devices and the sensor data is sensed from the label or tag by the one or more sensing devices.

6. The system of claim 1, wherein the container includes the same type of items.

7. The system of claim 1, wherein the cutting pattern species that the cutting tool selected is a laser and that the intensity of the laser is adjusted to a predetermined value.

8. The system of claim 1, wherein the mathematical model is a convolutional neural network (CNN).

9. The system of claim 1, wherein the scanning surface is a conveyor belt.

10. The system of claim 1, wherein the one or more sensing devices comprises a scanning device and a sensor, the scanning device and sensor being separate from each other.

11. A method for opening a container, the method comprising:
    providing a container opening machine including at least one cutting tool, the at least one cutting tool being one or more of a saw blade or a laser, wherein the at least one cutting tool is applied to each of a plurality of containers arriving on a scanning surface to open the container;
    at a control circuit, receiving sensor data and scanned images from one or more sensing devices, the sensor data identifying the contents of the container and the scanned images being of the contents of the interior of the container;
    at the control circuit, analyzing the sensor data and the scanned images, wherein features of the contents of the container is obtained;
    at the control circuit, applying the features to a mathematical model wherein a cutting pattern is produced, the cutting pattern specifying which of the one or more cutting tools to be used and the location of where cuts are to be made;
    at the control circuit, sending the cutting pattern to the container opening machine;
    wherein the container opening machine is operated and the container cut and opened by the container opening machine according to the cutting pattern.

12. The method of claim 11, wherein the cutting pattern further includes the depth of the cuts into the container.

13. The method of claim 11, wherein the cutting pattern further includes the speed of the cutting tool.

14. The method of claim 11, wherein the features of the contents include one or more of the dimensions of the contents, the spacing of the contents, the shape of the contents, the size of the contents, the number of contents in the container, the monetary value of the contents, and the orientation of the contents.

15. The method of claim 11, wherein the container includes a label or tag that is scanned by the one or more sensing devices and the sensor data is sensed from the label or tag by the one or more sensing devices.

16. The method of claim 11, wherein the container includes the same type of items.

17. The method of claim 11, wherein the cutting pattern species that the cutting tool selected is a laser and that the intensity of the laser is adjusted to a predetermined value.

18. The method of claim 11, wherein the mathematical model is a convolutional neural network (CNN).

19. The method of claim 11, wherein the scanning surface is a conveyor belt.

20. The method of claim 11, wherein the one or more sensing devices comprises a scanning device and a sensor, the scanning device and sensor being separate from each other.

* * * * *

UNITED STATES PATENT AND TRADEMARK OFFICE
CERTIFICATE OF CORRECTION

| | | |
|---|---|---|
| PATENT NO. | : 12,115,590 B2 | Page 1 of 1 |
| APPLICATION NO. | : 18/131923 | |
| DATED | : October 15, 2024 | |
| INVENTOR(S) | : James Benjamin Edwards and Paul E. Durkee | |

It is certified that error appears in the above-identified patent and that said Letters Patent is hereby corrected as shown below:

On the Title Page

In Item (57), under "Abstract", in Column 2, Lines 6-7, delete "container cut" and insert -- container is cut --, therefor.

In the Claims

In Column 11, Claim 1, Line 40, delete "container cut" and insert -- container is cut --, therefor.

In Column 12, Claim 11, Line 32, delete "container cut" and insert -- container is cut --, therefor.

Signed and Sealed this
Eleventh Day of February, 2025

Coke Morgan Stewart
*Acting Director of the United States Patent and Trademark Office*